(12) United States Patent
Yuda et al.

(10) Patent No.: US 12,549,225 B2
(45) Date of Patent: Feb. 10, 2026

(54) COMMUNICATION APPARATUS AND COMMUNICATION METHOD

(71) Applicant: Panasonic Holdings Corporation, Osaka (JP)

(72) Inventors: Yasuaki Yuda, Kanagawa (JP); Akihiko Nishio, Osaka (JP); Shotaro Maki, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 63 days.

(21) Appl. No.: 18/417,933

(22) Filed: Jan. 19, 2024

(65) Prior Publication Data

US 2024/0267090 A1  Aug. 8, 2024

(30) Foreign Application Priority Data

Feb. 6, 2023 (JP) ................................ 2023-016022

(51) Int. Cl.
*H04B 7/0413* (2017.01)
*H04B 7/08* (2006.01)

(52) U.S. Cl.
CPC .......... *H04B 7/0413* (2013.01); *H04B 7/084* (2013.01)

(58) Field of Classification Search
CPC ................ H04B 7/0413; H04B 7/084
See application file for complete search history.

(56) References Cited

U.S. PATENT DOCUMENTS 8,139,544 B1 * 3/2012 Webster ............... H04B 7/0684
370/208

FOREIGN PATENT DOCUMENTS

JP  2005252602 A  9/2005

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.3.0, Sep. 2018. (92 pages).
Yamazaki et al., "Proposal for a User-Centric Ran Architecture Towards Beyond 5G," The Institute of Electronics, Information and Communication Engineers, IEICE Technical Report, SAT2021-43, 121(189):4-10, Oct. 2021.

* cited by examiner

*Primary Examiner* — Rahel Guarino
(74) *Attorney, Agent, or Firm* — Seed Intellectual Property Law Group LLP (57) ABSTRACT

A communication apparatus includes reception circuitry which, in operation, receives a signal transmitted in a multiple-input multiple-output (MIMO) transmission, and control circuitry which, in operation, controls phase noise compensation of the signal in at least one of a pre-stage or a post-stage of MIMO separation processing in accordance with a condition.

4 Claims, 7 Drawing Sheets

FIG. 3B (b) DISTRIBUTED ANTENNA SYSTEM

COMMUNICATION APPARATUS AND COMMUNICATION METHOD

BACKGROUND

1. Technical Field

The present disclosure relates to a communication apparatus and a communication method.

2. Background Art

Multiple-input multiple-output (MIMO) transmission is used to improve throughput in cellular wireless communication such as 5G new radio access technology (NR) (See, for example, 3GPP TS 38.300, V15.3.0 "NR; NR and NG-RAN Overall Description; Stage 2 (Release 15)", 2018-09).

SUMMARY

However, there is room for study on a method for compensation of a phase noise.

One non-limiting and exemplary embodiment facilitates providing a communication apparatus and a communication method capable of correction of a phase noise.

In one general aspect, the techniques disclosed here feature a communication apparatus including reception circuitry which, in operation, receives a signal transmitted in a multiple-input multiple-output (MIMO) transmission, and control circuitry which, in operation, controls phase noise compensation of the signal in at least one of a pre-stage or a post-stage of MIMO separation processing in accordance with a condition.

It should be noted that general or specific embodiments may be implemented as a system, a method, an integrated circuit, a computer program, a storage medium, or any selective combination thereof.

According to a non-limiting and exemplary embodiment of the present disclosure, the phase noise can be compensated.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION OF PREFERRED EMBODIMENTS

Hereinafter, exemplary embodiments of the present disclosure will be described in detail with reference to the drawings.

For a sixth generation mobile communication system (6G system), virtualization of a system such as a "virtualized terminal" or a "virtualized base station" using a plurality of relay apparatuses or wireless antennas disposed in a distributed manner has been studied (see, for example, Kosuke Yamazaki et al., "PROPOSAL FOR A USER-CENTRIC RAN ARCHITECTURE TOWARDS BEYOND 5G", IEICE Technical Report, vol. 121, no. 189, SAT 2021-43, pp. 4-10, October 2021; hereinafter, referred to as NPL 2). Such a virtualization system may be referred to as a "virtualization terminal system" or a "distributed antenna system".

In addition, in the 6G, in addition to a millimeter wave band, utilization of a radio wave having a high frequency such as a terahertz band (or a sub-terahertz band) of 100 GHz or more has been studied. For example, NPL 2 proposes a system using a terahertz wave for communication near a terminal.

In MIMO transmission, a base station (for example, also referred to as a gNB or a gNodeB) and a terminal (for example, also referred to as user equipment (UE)) improve throughput by transmitting and receiving a plurality of data streams by using a plurality of antennas. Since the MIMO transmission is transmission using identical time and frequency resources, a reception-side apparatus performs data stream separation processing (hereinafter, referred to as "MIMO separation processing"). For example, the reception-side apparatus performs the MIMO separation processing by using a channel matrix generated from a channel estimation value.

In a case where the high frequency band such as the millimeter wave and the terahertz wave is used, it is easily influenced by a phase noise generated in a local oscillator. The influence of the phase noise appears as, for example, a common phase error (CPE) or inter-carrier interference (ICI), and may cause deterioration of an error rate. Thus, the reception-side apparatus performs phase noise compensation processing such as CPE compensation or ICI removal in order to reduce the influence of the phase noise.

For the 6G, although the virtualization system using the high frequency band has been studied, the influence of the phase noise or a frequency offset generated in each of a plurality of wireless antennas on communication performance and a countermeasure therefor have not been sufficiently studied. For example, in a case where independent phase noises are generated in the plurality of wireless antennas on at least one of a transmission side or a reception side, characteristics may deteriorate unless phase noise compensation is appropriately performed.

In a non-limiting exemplary embodiment of the present disclosure, for example, a method for performing the phase noise compensation in a case where independent phase noises are generated in a plurality of wireless antennas of at least one of a transmission side or a reception side will be described. For example, a communication apparatus (for example, at least one of a base station or a terminal) may be configured to compensate phase noises in a pre-stage and a post-stage of the MIMO separation processing, and may control the phase noise compensation in at least one (for example, any one or both) of the pre-stage and the post-stage of the MIMO separation processing in accordance with a predetermined condition.

First Exemplary Embodiment

[Overview of Communication System]

A communication system according to an exemplary embodiment of the present disclosure includes at least one communication apparatus 100. Communication apparatus 100 may be, for example, a base station or a terminal.

For example, communication apparatus 100 may perform at least one of transmission or reception on signals of radio frequency bands.

Figure 1:
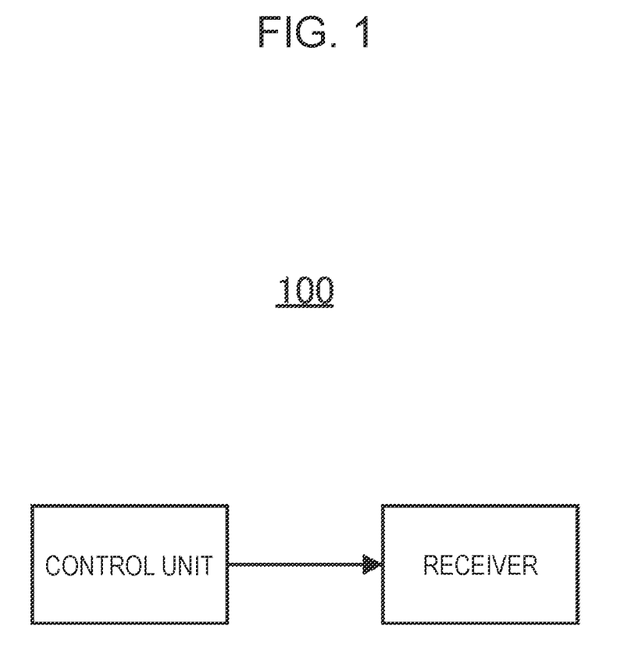
FIG. 1 is a block diagram illustrating a configuration example of a part of a communication apparatus.

FIG. 1 is a block diagram illustrating a configuration example of a part of communication apparatus 100. In communication apparatus 100 illustrated in FIG. 1, a receiver (for example, corresponding to a reception circuit) receives a signal transmitted in a MIMO manner. A control unit (for example, corresponding to a control circuit) controls the phase noise compensation of the signal in at least one of the pre-stage or the post-stage of the MIMO separation processing in accordance with the condition.

[Configuration Example of Communication Apparatus]

Figure 2:
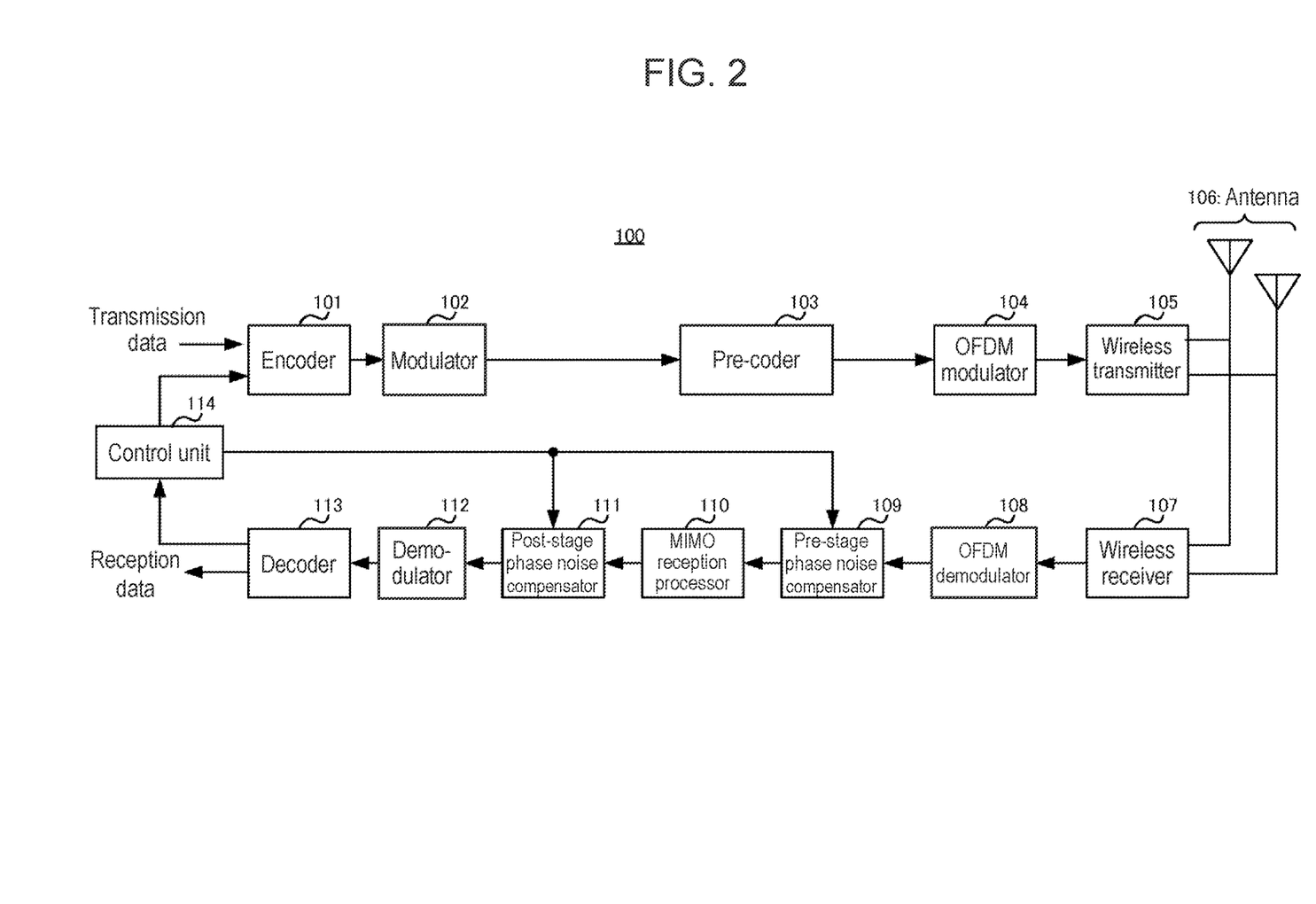
FIG. 2 is a block diagram illustrating a configuration example of the communication apparatus.

FIG. 2 is a block diagram illustrating an example of a configuration of communication apparatus 100 according to the present exemplary embodiment. Communication apparatus 100 illustrated in FIG. 2 may include, for example, encoder 101, modulator 102, precoder 103, orthogonal frequency division multiplexing (OFDM) modulator 104, wireless transmitter 105, antennas 106, wireless receiver 107, OFDM demodulator 108, pre-stage phase noise compensator 109, MIMO reception processor 110, post-stage phase noise compensator 111, demodulator 112, decoder 113, and control unit 114.

At least one of encoder 101 to OFDM modulator 104 or OFDM demodulator 108 to control unit 114 illustrated in FIG. 2 may be included in the control unit illustrated in FIG. 1. In addition, at least one of antennas 106 or wireless receiver 107 illustrated in FIG. 2 may be included in the receiver illustrated in FIG. 1.

<Transmission Processing>

For example, encoder 101 performs error correction coding on a signal by using coding schemes such as turbo coding, low density parity check (LDPC) coding, and polar coding.

For example, modulator 102 maps a coded bit string to an IQ constellation such as quadrature phase shift keying (QPSK) and 16-quadrature amplitude modulation (16QAM) to generate modulation symbols.

For example, precoder 103 performs precoding processing (for example, weighting processing on the modulation symbols) for MIMO transmission on the modulation symbols input from modulator 102. Note that, in a case where communication apparatus 100 does not perform MIMO transmission, precoder 103 need not perform processing.

For example, OFDM modulator 104 maps a transmission signal input from precoder 103 to a subcarrier, and converts the transmission signal from a frequency domain signal to a time domain signal by inverse fast Fourier transform (IFFT) processing to generate an OFDM signal. In addition, OFDM modulator 104 adds a cyclic prefix (CP) by copying, to the head, a part of a sample at the end of the OFDM symbol of the signal after the IFFT. At this time, OFDM modulator 104 may perform windowing processing for reducing an out-of-band radiation power due to discontinuity between OFDM symbols. Note that, filtering processing may be performed instead of the windowing processing, or another waveform shaping processing for limiting a frequency band may be performed.

Wireless transmitter 105 performs wireless transmission processing such as digital-to-analog conversion, up-conversion to a transmission frequency using a local oscillator, and signal amplification processing, and transmits the signal after the wireless transmission processing from antenna 106.

Note that, the processing in each unit that performs the reception processing may be performed for each system of the plurality of antennas. In addition, each antenna system may process transmission signals to different relay terminals (for example, case of the virtualization terminal system) or access points (APs) (for example, case of the distributed antenna system). In addition, processors such as wireless transmitters that perform kinds of processing of the antenna systems may be in an identical housing, or may be disposed in a distributed manner in different housings.

<Reception Processing>

Wireless receiver 107 performs wireless reception processing such as down-conversion using a local oscillator, analog-digital conversion, and a band-limiting filter on a signal received by antennas 106, for example, to obtain a baseband signal.

For example, OFDM demodulator 108 removes CP added to the signal input from wireless receiver 107, performs fast Fourier transform (FFT) processing on the signal from which CP has been removed, and converts the signal from a time domain signal into a frequency domain signal.

For example, pre-stage phase noise compensator 109 estimates the influence of the phase noise for each reception antenna system according to an instruction from control unit 114, and performs the phase noise compensation processing. For example, pre-stage phase noise compensator 109 estimates a phase rotation amount of the signal (for example, for each OFDM symbol) before the MIMO separation processing by using the reference signal (for example, phase tracking reference signal (PTRS)), and compensates the CPE caused by the phase noise.

MIMO reception processor 110 performs, for example, MIMO reception processing including channel equalization (or MIMO separation processing), and separates (or detect) the multiplexed stream signals. Note that, in a case where the MIMO transmission is not performed, the MIMO reception processor may perform the channel equalization and may not detect the stream signal. In addition, MIMO reception processor 110 may estimate channel (propagation path) variation by using the reference signal before the MIMO reception processing.

For example, post-stage phase noise compensator 111 performs phase noise compensation for each stream signal separated by MIMO reception processor 110 according to an instruction from control unit 114. For example, post-stage phase noise compensator 111 estimates a phase rotation amount of the signal after the MIMO separation processing (for example, for each stream signal) by using the reference signal (for example, PTRS), and compensates the CPE caused by the phase noise.

Demodulator 112 converts, into a bit string, a modulation symbol modulated by a modulation scheme such as QPSK or 16QAM.

Decoder 113 performs decoding processing of a bit string coded by a coding scheme such as LDPC coding.

Note that, kinds of processing in the units that perform the reception processing may be performed for each system of the plurality of antennas. In addition, each antenna system may process reception signals from different relay terminals or APs. In addition, processors such as wireless receivers that perform kinds of processing of the antenna systems may be in an identical housing, or may be disposed in a distributed manner in different housings.

<Control Unit>

For example, control unit 114 determines information regarding whether or not the local oscillators used in the plurality of transmission antenna systems (for example, may be referred to as branches) of communication apparatus 100 are common between the plurality of transmission antenna systems or information regarding accuracy (or performance) of the local oscillator, and outputs, as control information, the information to encoder 101.

In addition, control unit 114 controls an operation of pre-stage phase noise compensator 109 (operation of phase noise compensation) based on, for example, information regarding whether local oscillators used in the plurality of reception antenna systems of communication apparatus 100 are common between the plurality of reception antenna systems (for example, whether these local oscillators are common or independent).

In addition, control unit 114 controls an operation of post-stage phase noise compensator 111 (operation of phase noise compensation) based on, for example, information regarding a local oscillator of a transmission antenna system of a partner station received from a communication partner (partner station) of communication apparatus 100. Note that, the information regarding the local oscillator of the transmission antenna system of the partner station may include, for example, information regarding whether or not the local oscillators used in the plurality of transmission antenna systems of the partner station are common between the plurality of transmission antenna systems, or information regarding the accuracy (or performance) of the local oscillator.

[Operation Example of Communication Apparatus]

Next, an operation example of communication apparatus 100 will be described.

Hereinafter, for example, an operation example (or a control method) of the phase noise compensation processing in communication apparatus 100 will be described.

For example, communication apparatus 100 may control the phase noise compensation in at least one of pre-stage phase noise compensator 109 or post-stage phase noise compensator 111 in accordance with a condition based on phase noises of a plurality of transmission antennas (for example, antennas of the partner station) used for the MIMO transmission and phase noises of a plurality of reception antennas (for example, antennas 106 of communication apparatus 100) used for the MIMO transmission. For example, communication apparatus 100 may determine the activation and deactivation of pre-stage phase noise compensator 109 and post-stage phase noise compensator 111 in accordance with the condition.

For example, communication apparatus 100 performs the phase noise compensation in pre-stage phase noise compensator 109 in the following cases.

Case where a phase noise is added to each MIMO reception antenna system
  Case where a phase noise stronger than on transmission side is added on reception side of MIMO channel For example, communication apparatus 100 (for example, control unit 114) may control an operation of pre-stage phase noise compensator 109 based on at least one of the information regarding whether or not the local oscillator used in the reception antenna system of communication apparatus 100 is common between the reception antenna systems or the information regarding the accuracy of the local oscillator.

For example, control unit 114 may perform control such that the information regarding whether or not the local oscillator used in the reception antenna system of communication apparatus 100 is common or the information regarding the accuracy of the local oscillator is set in advance, and that the phase noise tracking is performed in pre-stage phase noise compensator 109 in a case where the local oscillator is independent between the reception antenna systems of communication apparatus 100 (or in a case where the local oscillator is not common). For example, control unit 114 may perform the phase noise compensation in the pre-stage of the MIMO separation processing in a case where different phase noises are added to the plurality of reception antenna systems of communication apparatus 100 used for the MIMO transmission.

In addition, for example, in a case where the local oscillators are independent between the plurality of reception antenna systems and the accuracy of the local oscillator is less than or equal to a predetermined level, control unit 114 may perform control such that the phase noise compensation is performed in pre-stage phase noise compensator 109.

In addition, for example, control unit 114 may perform control such that the phase noise compensation is performed in the pre-stage of the MIMO separation processing (for example, pre-stage phase noise compensator 109) in a case where the phase noise in the reception antenna system of communication apparatus 100 is stronger than the phase noise in the transmission antenna system of the partner station. The phase noise or the comparison (for example, magnitude) of the phase noise in the reception antenna system and the transmission antenna system may be estimated based on, for example, a frequency to be used (for example, whether or not the frequency is a terahertz wave or a millimeter wave), the presence or absence of use of the relay station (or the relay terminal), or the presence or absence of use of the distributed antenna (for example, usage status).

Note that, the reception antenna system may be, for example, a reception system including the relay apparatus or the distributed antenna, and communication apparatus 100 may use information on the local oscillator received from the relay apparatus or the distributed antenna apparatus (for example, radio unit (RU) or the like).

In addition, for example, communication apparatus 100 performs the phase noise compensation in post-stage phase noise compensator 111 in the following cases.

Case where a phase noise is added to each MIMO transmission antenna system
  Case where a phase noise stronger than on reception side is added on transmission side of MIMO channel For example, communication apparatus 100 (for example, control unit 114) may control an operation of post-stage phase noise compensator 111 based on at least one of the information regarding whether or not the local oscillator used in the transmission antenna system of the communication partner (partner station) is common between the transmission antenna systems or the information regarding the accuracy of the local oscillator.

For example, control unit 114 may perform control such that the information regarding whether or not the local oscillator used in the transmission antenna system of the partner station is common is received (or retained), and that the phase noise compensation is performed in post-stage phase noise compensator 111 in a case where the local oscillator is independent between the transmission antenna systems of the partner station (or in a case where the local oscillator is not common). For example, control unit 114 may perform the phase noise compensation in the post-stage of the MIMO separation processing in a case where different phase noises are added to the plurality of transmission antenna systems of the partner station used for the MIMO transmission.

In addition, for example, control unit 114 may perform control such that the phase noise compensation is performed in post-stage phase noise compensator 111 in a case where the local oscillators are independent between the plurality of transmission antenna systems and the accuracy of the local oscillator is less than or equal to a predetermined level.

In addition, for example, control unit 114 may perform control such that the phase noise compensation is performed in the post-stage of the MIMO separation processing (for example, post-stage phase noise compensator 111) in a case where the phase noise in the transmission antenna system of the partner station is stronger than the phase noise in the reception antenna system of communication apparatus 100. The phase noise or the comparison (for example, magnitude) of the phase noise in the reception antenna system and the transmission antenna system may be estimated based on, for example, a frequency to be used (for example, whether or not the frequency is a terahertz wave or a millimeter wave), the presence or absence of use of the relay station (or the relay terminal), or the presence or absence of use of the distributed antenna (for example, usage status).

In addition, for example, control unit 114 may receive the information regarding the accuracy (or performance) of the local oscillator used in the transmission antenna system of the partner station and may control the phase noise compensation in pre-stage phase noise compensator 109 and post-stage phase noise compensator 111 in accordance with a difference in accuracy (or a performance difference) between the local oscillator of communication apparatus 100 and the local oscillator of the partner station.

Next, an example in which the virtualization terminal system and the distributed antenna system studied for the 6G will be described as an operation example of the communication system using communication apparatus 100 described above.

Figure 3A:
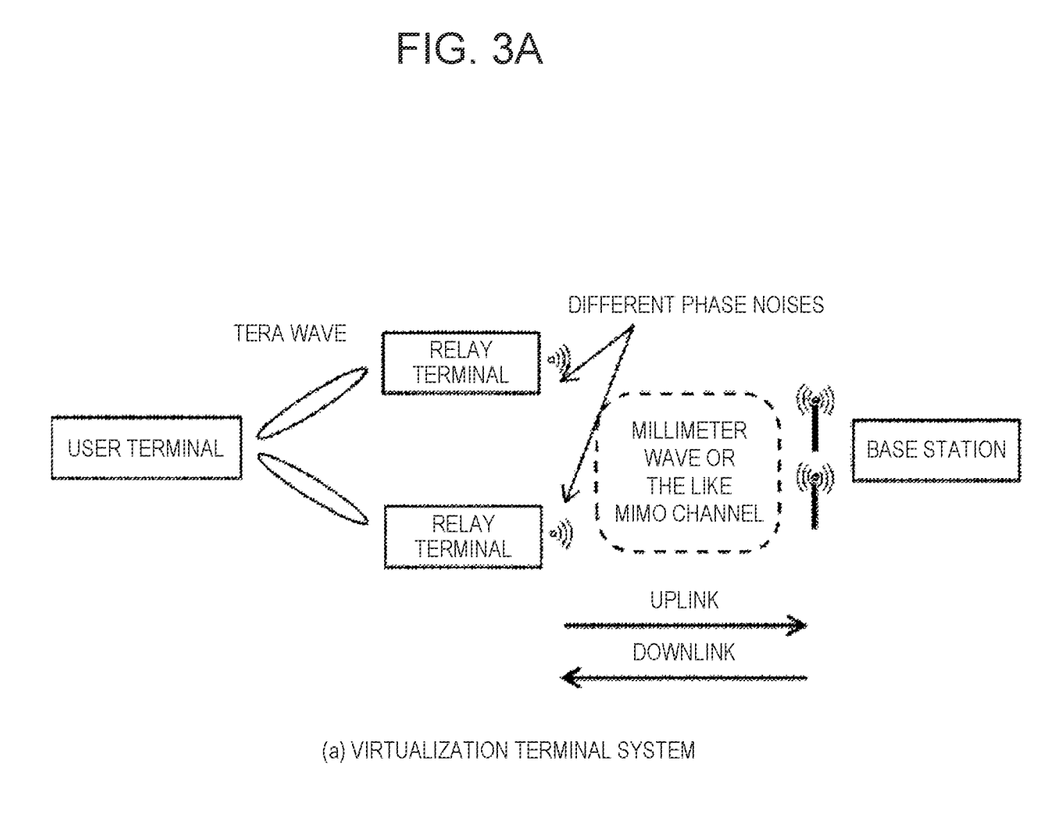
FIG. 3A is a diagram illustrating an example of a virtualization terminal system.

FIG. 3A illustrates a configuration example of the virtualization terminal system.

In the virtualization terminal system illustrated in FIG. 3A, a user terminal and the relay terminal are connected by a radio wave (for example, terahertz wave), and the user terminal and the relay terminal behave like one terminal apparatus. For example, the relay terminal is used as a remote antenna connected to the user terminal by a link using the radio wave (for example, terahertz wave or the like).

Here, in a case where each relay terminal is a transmission and reception antenna system of the terminal (for example, communication apparatus 100 in FIG. 2), each of the constituent elements related to the transmission processing of each antenna system in FIG. 2 processes a signal to a different relay terminal, and each of the constituent elements related to the reception processing of each antenna system in FIG. 2 processes a signal from a different relay terminal. Then, since each relay terminal is a transmission and reception antenna system of the terminal, the user terminal communicates with the base station by using the local oscillator independent (or not common) between the transmission antenna systems and between the reception antenna systems. On the other hand, in the example of FIG. 3A, the base station (for example, partner station of communication apparatus 100) uses the local oscillator common to two antennas.

Figure 3B:
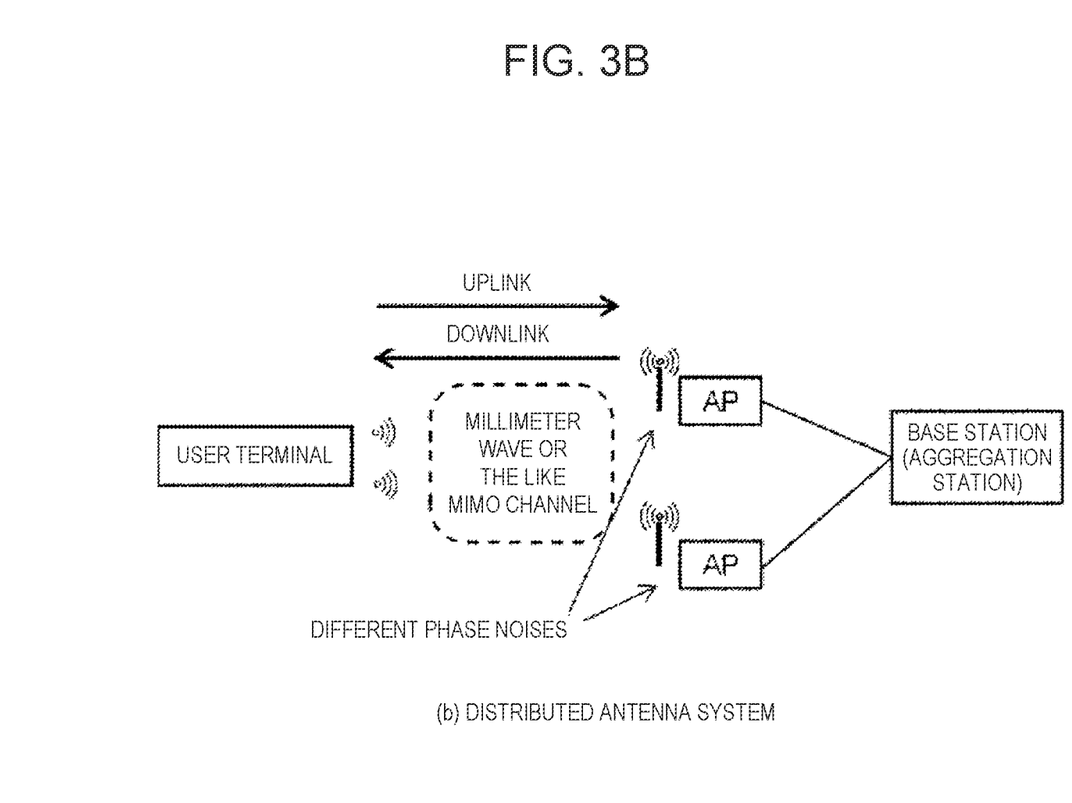
FIG. 3B is a diagram illustrating an example of a distributed antenna system.

FIG. 3B illustrates a configuration example of the distributed antenna system.

In the distributed antenna system illustrated in FIG. 3B, a plurality of APs or RUs disposed in a distributed manner are connected to the base station (for example, communication apparatus 100 in FIG. 2), and each AP or RU serves as a transmission and reception antenna system of the base station. For example, in FIG. 2, each of the constituent elements related to the transmission processing of each antenna system processes a signal to a different AP, and in FIG. 2, each of the constituent elements related to the reception processing of each antenna system processes a signal from a different AP. Then, since each AP is the transmission and reception antenna system of the base station, the base station performs communication with the terminal by using the local oscillator independent (not common) between the transmission antenna systems and between the reception antenna systems. On the other hand, in the example of FIG. 3B, the user terminal (for example, the partner station of communication apparatus 100) uses the local oscillator common to two antennas.

Figure 4A:
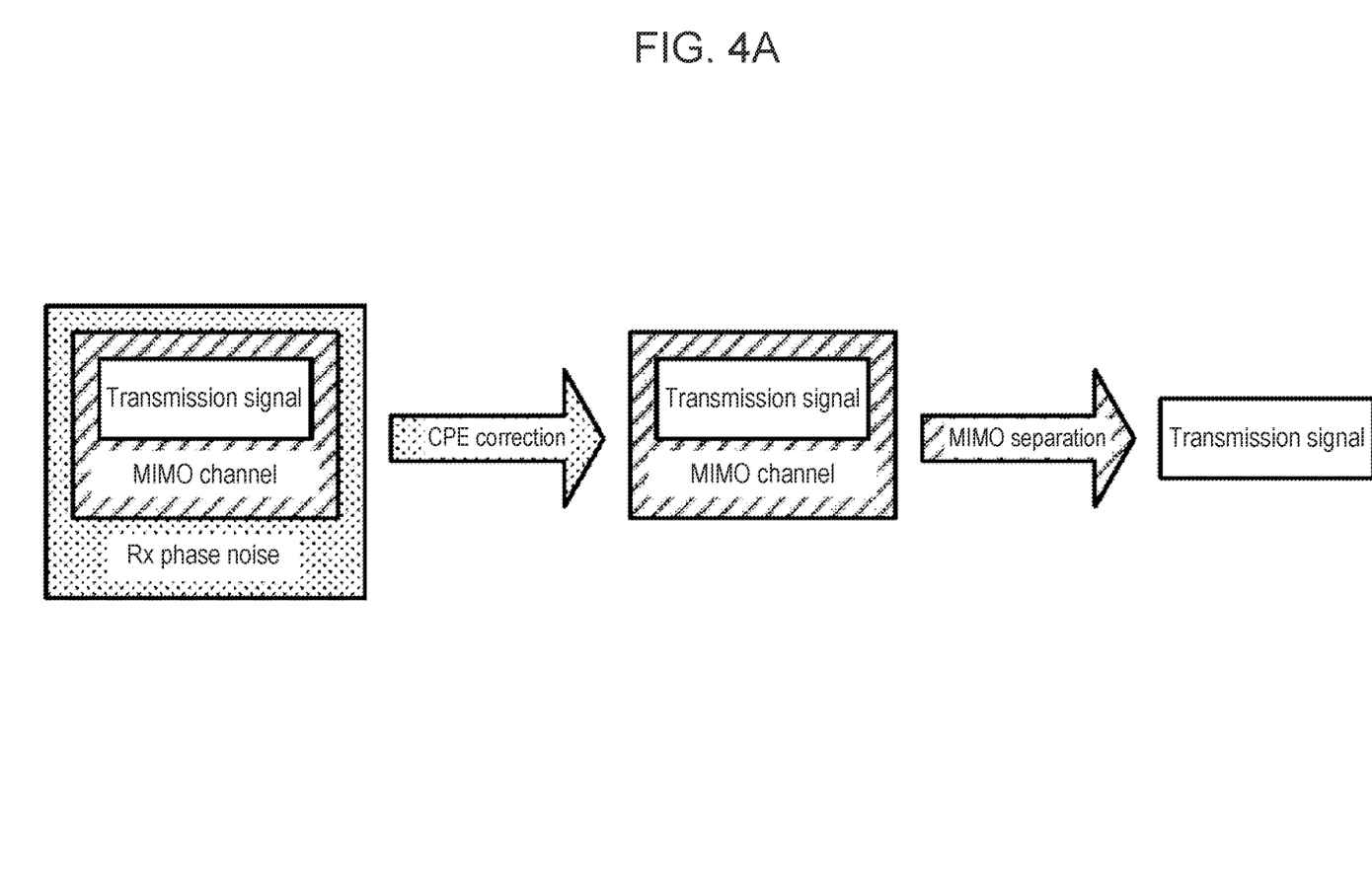
FIG. 4A is a diagram illustrating an example of phase noise compensation.

As described above, in a downlink of the virtualization terminal system illustrated in FIG. 3A and an uplink of the distributed antenna system illustrated in FIG. 3B, an independent phase noise may be generated for each reception antenna system on the reception side. In this case, as illustrated in FIG. 4A, a phase noise is added to the transmission signal in each of the reception antenna systems after the transmission signal passes through the MIMO channel (for example, radio propagation path between the plurality of antennas). Thus, as illustrated in FIG. 4A, when the reception processing is performed, communication apparatus 100 obtains the transmission signal (stream) by performing the phase noise compensation (for example, CPE compensation) on the signal of each reception antenna system and performing the MIMO reception processing (MIMO stream separation) after the influence of the phase noise is reduced.

Figure 4B:
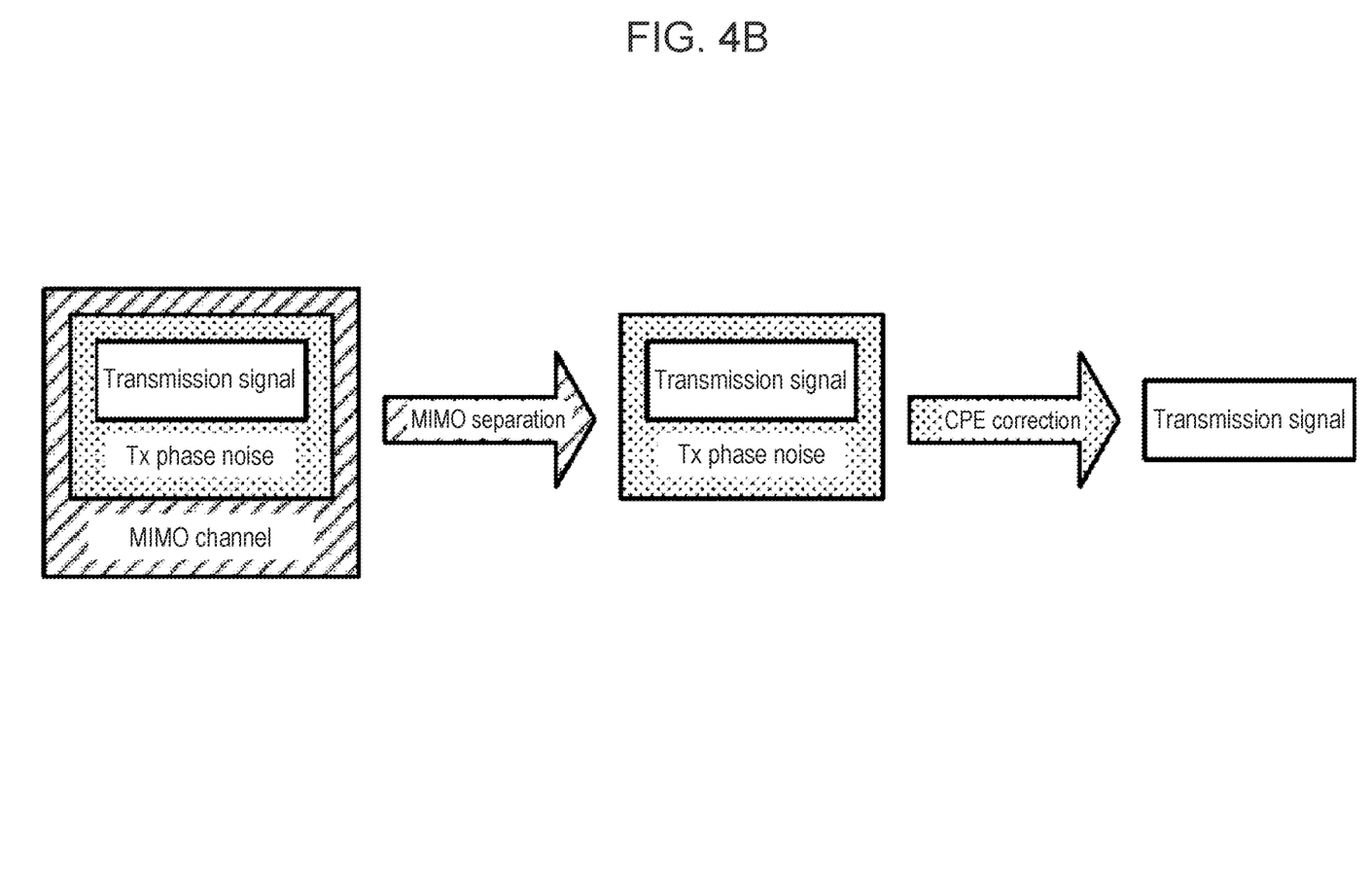
FIG. 4B is a diagram illustrating an example of the phase noise compensation.

In addition, in an uplink of the virtualization terminal system of FIG. 3A and a downlink of the distributed antenna system illustrated in FIG. 3B, an independent phase noise may be generated for each transmission antenna system on the transmission side. In this case, as illustrated in FIG. 4B, the transmission signal is received through the MIMO channel after a phase noise is added to the transmission signal in each of the transmission antenna systems. Thus, when the reception processing is performed, communication apparatus 100 obtains the transmission signal (stream) by performing the MIMO reception processing (MIMO stream separation) and then performing the phase noise compensation (for example, CPE compensation) on each stream.

Note that, the phase noise compensation may be CPE compensation, ICI removal, or both the CPE compensation and the ICI removal.

As described above, in the present exemplary embodiment, communication apparatus 100 receives the signal transmitted in the MIMO manner, and controls the phase noise compensation of the signal in at least one of the pre-stage or the post-stage of the MIMO separation processing in accordance with the condition. For example, communication apparatus 100 may determine whether to perform the phase noise compensation in the pre-stage or the post-stage of the MIMO separation processing based on the phase noises of the plurality of transmission antennas used for the MIMO transmission and the phase noises of the plurality of reception antennas used for the MIMO transmission.

As a result, communication apparatus 100 can appropriately perform the phase noise compensation in accordance with the transmission and reception or a status of the phase noise between the antenna systems, and an error rate characteristic, a throughput characteristic, or coverage performance can be improved.

Second Exemplary Embodiment

In the present exemplary embodiment, in addition to the phase noise compensation processing, a method for controlling the MIMO reception processing in accordance with the phase noise and a compensation status will be described.

Figure 5:
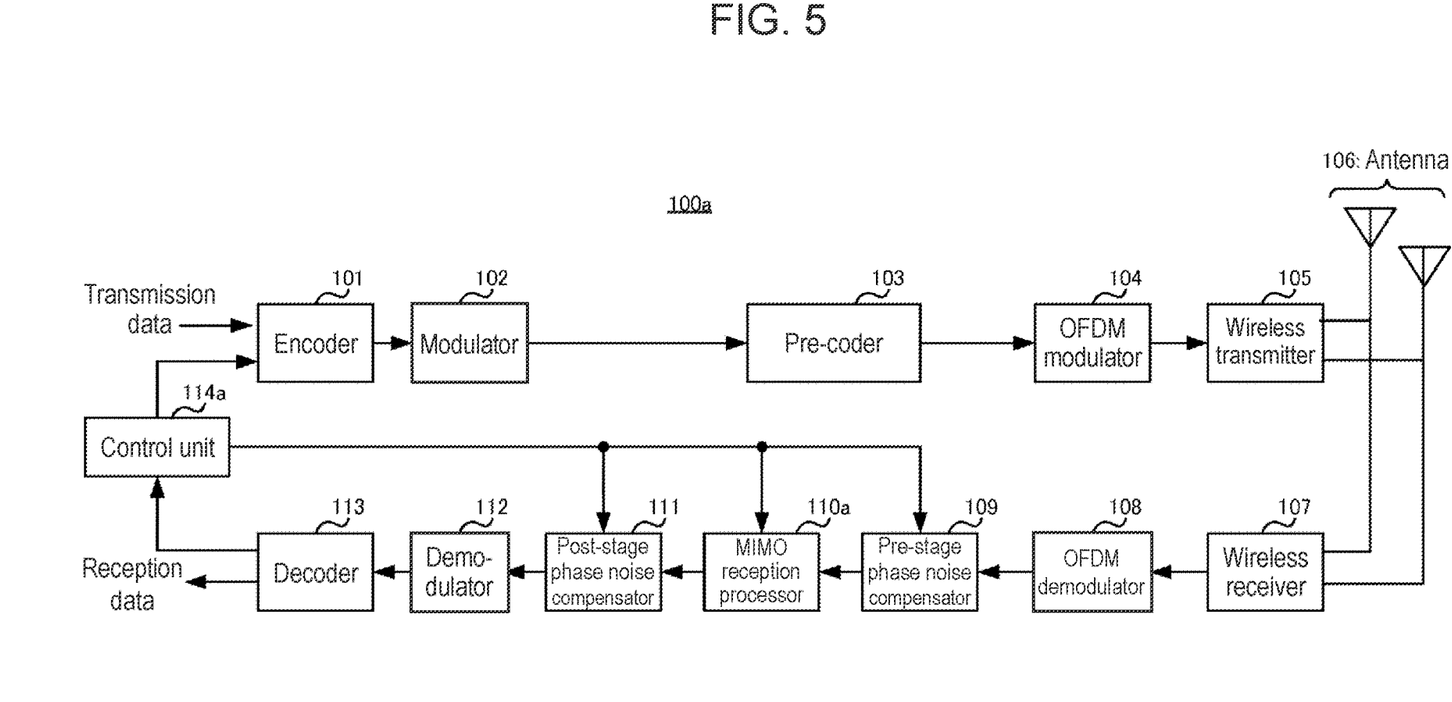
FIG. 5 is a block diagram illustrating a configuration example of the communication apparatus.

FIG. 5 is a block diagram illustrating a configuration example of communication apparatus 100a according to the present exemplary embodiment. Communication apparatus 100a illustrated in FIG. 5 is different from the first exemplary embodiment in that control unit 114a controls a method of the MIMO reception processing for MIMO reception processor 110a.

For example, control unit 114a may control setting related to a noise power in the MIMO separation processing by MIMO reception processor 110a in accordance with the condition related to the phase noise and the compensation status. For example, the setting of a minimum mean square error (MMSE) noise power term in the MIMO reception processing may be switched in accordance with the phase noise and the compensation status.

For example, MIMO reception processor 110a performs signal separation by generating a weight (for example, MMSE weight) as represented in Equation (1) and multiplying the reception signal by the generated weight.

$$W = \hat{H}^H \left\{ \hat{H}\hat{H}^H + \frac{N}{S}I \right\}^{-1} \quad \text{(Equation 1)}$$

Here, $\hat{H}$ indicates a channel matrix estimated by channel estimation, S indicates a reception signal power, N indicates a noise power, and I indicates a unit matrix.

For example, N may include an interference power (for example, ICI interference power) included in the reception signal in addition to a thermal noise power.

In the present exemplary embodiment, control unit 114 a controls a value used as N (noise power term) according to the status of the phase noise. For example, control unit 114a may perform the following control.

For example, in a case where a common local oscillator is used between the antenna systems on the reception side, control unit 114a may set the value of N based on the thermal noise power. That is, the value of N may not be based on the interference power. In this case, since the influence of the phase noise can be treated as a part of the MIMO channel, communication apparatus 100a may perform the phase noise compensation after the MIMO separation. As described above, when it is not necessary to perform the phase noise compensation in the pre-stage of the MIMO separation processing, only the thermal noise power may be considered in the MIMO reception processing.

In addition, for example, in a case where independent local oscillators are used between the antenna systems on the reception side, control unit 114a may set the value of N based on a power obtained by adding the ICI interference power to the thermal noise power. In this case, although communication apparatus 100a performs the phase noise compensation before the MIMO reception processing, since an ICI component remains even though the CPE compensation can be performed, the MIMO separation performance is influenced. As described above, in a case where the ICI removal is not performed in the phase noise compensation in the pre-stage of the MIMO separation processing, the ICI interference power may be considered in addition to the thermal noise power in the MIMO reception processing. Note that, in a case where both the CPE compensation and the ICI removal are performed as the phase noise compensation, since the ICI component can also be removed, in the MIMO reception processing, the setting of N may be performed in consideration of the thermal noise and the remaining ICI component.

In addition, control unit 114a may estimate a degree of ICI based on the information regarding the accuracy (or performance) of the local oscillator received from the partner station, and may set the value of the noise power term (for example, N) based on the estimation result.

As a result, communication apparatus 100a can appropriately perform the MIMO reception processing in accordance with the status of the phase noise, and an error rate characteristic, a throughput characteristic, or coverage performance can be improved.

Note that, communication apparatus 100a may control a value of a log likelihood ratio (LLR) in the decoding processing in addition to the control of the MMSE noise term. When the LLR is calculated, the noise power is considered, and a small LLR is used in a case where the noise power is large. Thus, the noise power for the LLR calculation linked with the value set in the MMSE noise term is set, and thus, an appropriate LLR can be set. Accordingly, decoding performance can be improved. In addition, the value of the LLR may be set depending on the presence or absence of the ICI removal processing in the phase noise compensation.

The exemplary embodiment of the present disclosure has been described above.

Note that, in the above exemplary embodiment, although the example in which whether to perform the phase noise compensation of the pre-stage or the post-stage of the MIMO separation processing is controlled in accordance with a phase noise level has been described, a parameter used in the control of the phase noise compensation is not limited to the phase noise level.

For example, whether to perform the phase noise compensation of the pre-stage or the post-stage of the MIMO separation processing may be controlled in accordance with a frequency band used for transmission and reception of the signal of the MIMO communication. For example, communication apparatus 100 (or communication apparatus 100a) may perform the phase noise compensation in the pre-stage of the MIMO separation processing in a case where the frequency of the reception antenna that performs the MIMO reception is higher than a predetermined value. In addition, for example, communication apparatus 100 (or communication apparatus 100a) may perform the phase noise compensation of the post-stage of the MIMO separation processing in a case where the frequency of the transmission antenna that performs the MIMO transmission is higher than a predetermined value.

In addition, in the above exemplary embodiment, although the example in which whether to perform the phase noise compensation of the pre-stage or the post-stage is controlled based on whether or not the local oscillator is common between the antenna systems has been described, the present disclosure is not limited thereto, and for example, the phase noise compensation may be controlled based on the presence or absence of the relay terminal. For example, communication apparatus 100 (or communication apparatus 100*a*) may perform the phase noise compensation in a case where the relay terminal is used and may not perform the phase noise compensation in a case where the relay terminal is not used. In addition, in a case where the relay terminal performs conversion of a frequency to a high frequency, since a large phase noise is generated, communication apparatus 100 (or communication apparatus 100*a*) may perform the phase noise compensation in a case where the relay terminal performs frequency conversion, and may not perform the phase noise compensation in a case where frequency conversion is not performed.

In addition, in the above exemplary embodiment, although the example in which communication apparatus 100 (or communication apparatus 100*a*) receives notification of the information regarding the local oscillator from the partner station and controls the phase noise compensation (for example, post-stage phase noise compensation) based on the notified information has been described, the notified information is not limited to the information regarding the local oscillator. For example, the information notified from the partner station may include information regarding a method of the phase noise compensation (for example, information related to necessity (or activation and deactivation) of the post-stage phase noise compensation).

In addition, in the above exemplary embodiment, although the example in which the terahertz wave or the millimeter wave is used has been described, other frequency bands can also be applied.

In addition, in the above exemplary embodiment, although the case of the virtualization terminal or the distributed antenna system using the relay terminal has been described, the present disclosure can also be applied to a normal terminal or base station (for example, in which antennas are not disposed in a distributed manner).

In addition, the exemplary embodiment of the present disclosure can be applied not only to the phase noise but also to phase variation compensation caused by frequency deviation (frequency offset) with the communication partner according to a similar method.

In addition, in the examples of FIGS. 3A and 3B, although the case where different phase noises are generated between the plurality of antennas in any one of the user terminal and the base station has been described, the present disclosure is not limited thereto. For example, in a case where different phase noises are generated between the plurality of antennas in both the user terminal and the base station, communication apparatus 100 (or communication apparatus 100*a*) may perform the phase noise compensation in both the pre-stage and the post-stage of the MIMO separation processing.

In addition, for example, in a case where the local oscillator is commonly used in the plurality of transmission antennas or the plurality of reception antennas, communication apparatus 100 may perform processing of compensating the phase noise generated in the local oscillator in any one of the pre-stage and the post-stage of the MIMO separation processing, or may perform processing of compensating the phase noises in both the pre-stage and the post-stage of the MIMO separation processing.

In addition, the millimeter wave band may be read as a frequency of "frequency range 2 (FR2)". In addition, the sub 6 GHz band may be read as a frequency of "frequency range 1 (FR1)".

In addition, the reference signal is not limited to the PTRS, and may be another signal. For example, the reference signal may be any of a demodulation reference signal (DMRS), a channel state information-reference signal (CSI-RS), a tracking reference signal (TRS), a cell-specific reference signal (CRS), and a sounding reference signal (SRS).

In addition, in the above exemplary embodiment, the notation " . . . unit" used for each component may be replaced with another notation such as " . . . circuit (circuitry)", " . . . device", or " . . . module".

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred as a communication apparatus. The communication apparatus may include a radio transceiver and a processing/control circuitry. The radio transceiver may include a receiver and a transmitter, or include receiving and transmitting functions. The radio transceiver (the transmitter and the receiver) may include a radio frequency (RF) module and one or more antennas. The RF module may include an amplifier, and an RF modulator and demodulator, or the like. Some non-limiting examples of such communication apparatus include a phone (e.g., cellular (cell) phone, smart phone), a tablet, a personal computer (PC) (e.g., laptop, desktop, notebook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A communication apparatus according to an exemplary embodiment of the present disclosure includes reception circuitry which, in operation, receives a signal transmitted in a multiple-input multiple-output (MIMO) transmission, and control circuitry which, in operation, controls phase noise compensation of the signal in at least one of a pre-stage or a post-stage of MIMO separation processing in accordance with a condition.

In the exemplary embodiment of the present disclosure, the condition is based on phase noises in a plurality of transmission antennas used for the MIMO transmission and phase noises in a plurality of reception antennas used for the MIMO transmission, and the control circuitry performs the phase noise compensation in the post-stage of the MIMO separation processing in a case where different phase noises are added to the plurality of transmission antennas, and performs the phase noise compensation in the pre-stage of the MIMO separation processing in a case where different phase noises are added to the plurality of reception antennas.

In the exemplary embodiment of the present disclosure, the condition is based on comparison of phase noises in a plurality of transmission antennas used for the MIMO transmission with phase noises of a plurality of reception antennas used for the MIMO transmission, and the control circuitry performs the phase noise compensation in the post-stage of the MIMO separation processing in a case where the phase noises in the plurality of transmission antennas are stronger than the phase noises in the plurality of reception antennas, and performs the phase noise compensation in the pre-stage of the MIMO separation processing in a case where phase noises in the plurality of reception antennas are stronger than phase noises in the plurality of transmission antennas.

In the exemplary embodiment of the present disclosure, the condition is based on a usage status of at least one of a relay station in the communication apparatus and a communication partner of the communication apparatus, a frequency used for transmission and reception of the signal, or a distributed antenna used for the transmission and reception of the signal.

In the exemplary embodiment of the present disclosure, the condition is based on whether a local oscillator is common or independent between a plurality of transmission antennas used for the MIMO transmission in a communication partner of the communication apparatus or a plurality of reception antennas used for the MIMO transmission in the communication apparatus.

In the exemplary embodiment of the present disclosure, the condition is based on a performance difference of a local oscillator between the communication apparatus and a communication partner of the communication apparatus.

In the exemplary embodiment of the present disclosure, the condition is based on information regarding a method of the phase noise compensation received from a communication partner of the communication apparatus.

In the exemplary embodiment of the present disclosure, the control circuitry controls setting related to a noise power in the MIMO separation processing in accordance with the condition.

In a communication method of the exemplary embodiment of the present disclosure, a communication apparatus includes receiving a signal transmitted in multiple-input multiple-output (MIMO) manner, and controlling phase noise compensation of the signal in at least one of a pre-stage or a post-stage of MIMO separation processing.

One aspect of the present disclosure is useful for a wireless communication system.

What is claimed is:

1. A communication apparatus comprising:
reception circuitry which, in operation, receives a signal transmitted in a multiple-input multiple-output (MIMO) transmission; and
control circuitry which, in operation, controls phase noise compensation of the signal in at least one of a pre-stage or a post-stage of MIMO separation processing in accordance with a condition, wherein:
the condition is based on phase noises in a plurality of transmission antennas used for the MIMO transmission and phase noises in a plurality of reception antennas used for the MIMO transmission, and
the control circuitry performs the phase noise compensation in the post-stage of the MIMO separation processing in a case where different phase noises are added to the plurality of transmission antennas, and performs the phase noise compensation in the pre-stage of the MIMO separation processing in a case where different phase noises are added to the plurality of reception antennas.

2. A communication apparatus comprising:
reception circuitry which, in operation, receives a signal transmitted in a multiple-input multiple-output (MIMO) transmission; and
control circuitry which, in operation, controls phase noise compensation of the signal in at least one of a pre-stage or a post-stage of MIMO separation processing in accordance with a condition, wherein:
the condition is based on comparison of phase noises in a plurality of transmission antennas used for the MIMO transmission with phase noises of a plurality of reception antennas used for the MIMO transmission, and
the control circuitry performs the phase noise compensation in the post-stage of the MIMO separation processing in a case where the phase noises in the plurality of transmission antennas are stronger than the phase noises in the plurality of reception antennas, and performs the phase noise compensation in the pre-stage of the MIMO separation processing in a case where phase noises in the plurality of reception antennas are stronger than phase noises in the plurality of transmission antennas.

3. A communication apparatus, comprising:
reception circuitry which, in operation, receives a signal transmitted in a multiple-input multiple-output (MIMO) transmission; and control circuitry which, in operation, controls phase noise compensation of the signal in at least one of a pre-stage or a post-stage of MIMO separation processing in accordance with a condition, wherein the control circuitry controls setting related to a noise power in the MIMO separation processing in accordance with the condition.

4. A communication method in a communication apparatus, comprising:

receiving a signal transmitted in a multiple-input multiple-output (MIMO) transmission; and controlling phase noise compensation of the signal in at least one of a pre-stage or a post-stage of MIMO separation processing in accordance with a condition, wherein:

the condition is based on phase noises in a plurality of transmission antennas used for the MIMO transmission and phase noises in a plurality of reception antennas used for the MIMO transmission, and the controlling includes performing the phase noise compensation in the post-stage of the MIMO separation processing in a case where different phase noises are added to the plurality of transmission antennas, and performing the phase noise compensation in the pre-stage of the MIMO separation processing in a case where different phase noises are added to the plurality of reception antennas.

* * * * *